United States Patent [19]
McCluskey et al.

[11] Patent Number: 5,869,146
[45] Date of Patent: Feb. 9, 1999

[54] PLASMA SPRAYED MULLITE COATINGS ON SILICON BASED CERAMIC MATERIALS

[75] Inventors: Philip H. McCluskey, Manchester; Harry E. Eaton, Jr., Woodstock, both of Conn.; Daniel R. Godin, East Waterboro, Me.; George E. Foster, Dudley, Mass.; H. David Harter, Munhall, Pa.; Stephen Chin, Wallingford; Glenn A. Cotnoir, Thompson, both of Conn.; Charles A. Ellis, Stuart, Fla.

[73] Assignee: United Technologies Corporation, Hartford, Conn.

[21] Appl. No.: 968,292

[22] Filed: Nov. 12, 1997

[51] Int. Cl.⁶ .................................................. C23C 4/10
[52] U.S. Cl. ............................... 427/452; 427/453
[58] Field of Search ........................... 427/452, 453

[56] References Cited

U.S. PATENT DOCUMENTS

| | | | |
|---|---|---|---|
| 4,559,270 | 12/1985 | Sara | 428/408 |
| 4,567,103 | 1/1986 | Sara | 428/408 |
| 4,588,699 | 5/1986 | Brennan et al. | 501/9 |
| 4,589,900 | 5/1986 | Brennan et al. | 65/33 |
| 5,391,404 | 2/1995 | Lee et al. | 427/453 |
| 5,496,644 | 3/1996 | Lee et al. | 428/446 |

FOREIGN PATENT DOCUMENTS

3538390A1   4/1987   Germany .................................. 427/452

OTHER PUBLICATIONS

Lee, Kang N. et al. "Oxidation Behavior of Mullite–Coated SiC and SiC/SiC Composites under Thermal Cycling between Room Temperature and 1200°–1400°." *Journal of the American Ceramic Society,* vol. 79(3), 1996, pp. 620–626. (no month date).

Lee, Kang N. et al. "New Generation of Plasma–Sprayed Mullite Coatings on Silicon Carbide." *Journal of the American Ceramic Society,* vol. 78(3), 1995, pp. 705–710. (no month date).

*Primary Examiner*—Katherine A. Bareford
*Attorney, Agent, or Firm*—Pamela J. Curbelo

[57] ABSTRACT

Coatings containing at least 85% by volume crystalline mullite with less than 15% by volume of amorphous material and mullite dissociation phases are plasma sprayed onto the surface of a silicon based ceramic substrate by closely controlling the plasma spray parameters including the mullite feed stock and its particle size, the nozzle outlet stand-off distance, movement of the substrate past the plasma flow, back side heating of the substrate and the powder feed rate through the plasma spray gun.

19 Claims, 2 Drawing Sheets

PLASMA SPRAYED MULLITE COATINGS ON SILICON BASED CERAMIC MATERIALS

This invention was made with Government support under contract number F33615-91-C-2118, awarded by the Department of the Air Force. The Government has certain rights in this invention.

BACKGROUND OF THE INVENTION (1). Field of the Invention

The present invention relates to plasma sprayed mullite coatings and to an improved method for plasma spraying mullite coatings onto silicon based ceramic materials. More particularly, the invention relates to an improved method for plasma spraying predominantly crystalline, crack-free, mullite coatings onto silicon based ceramics and composites without the need for preheating the substrate above the crystallization temperature of mullite.

(2). Description of the Prior Art

Silicon based ceramics such as silicon carbide and silicon nitride as well as composites of these materials have attracted considerable attention in recent years due to their high temperature capability and/or thermal stability in oxidizing environments. Such materials have found widespread interest for the fabrication of high temperature structures such as gas turbine components, combustor components, compressor linings, nozzles and heat exchanger equipment.

It has been found desirable, if not necessary, in many applications to apply a protective coating to the silicon based ceramics and composites in order to limit thermal gradients and thereby reduce thermally induced mechanical stresses within the substrate. Coatings have also been applied to these ceramic materials to provide environmental protection or to bond other environmentally protective coatings, such as those which are zirconia based, to the substrates. Ceramic coatings have also been provided in the form of abradables, for example, to provide gas path sealing for rotating turbine components and the like.

It is known that mullite ($3Al_2O_3 \cdot 2SiO_2$) is an excellent thermal barrier coating (TBC) for silicon based ceramics due to its low thermal conductivity. Mullite is stable in oxidizing atmospheres and also has a low thermal coefficient of expansion which nearly matches that of silicon carbide, for example. However, if mullite is thermally sprayed as a primarily amorphous coating, subsequent exposure to temperatures above about 1800° F. (about 980° C.) causes re-crystallization and sintering. This can result in shrinkage leading to severe surface cracking and eventually loss of the coating.

U.S. Pat. No. 5,391,404 issued to Kang N. Lee et al. on Feb. 21, 1995, discloses a method for plasma spraying adherent mullite coatings onto silicon based ceramic materials wherein a crystalline mullite powder is flame-sprayed onto a substrate inside a furnace which is heated to elevated temperatures for the spraying process. At temperatures above 1800° F. (about 980° C.) mullite can crystallize in the high temperature environment and the coating is observed to be free of any amorphous material after it is removed from the furnace.

One problem with this approach, however, has been that the coating must be applied at these high temperatures inside a heating furnace. This requirement limits the size and complexity of the substrate or part that can be coated using conventional thermal spray equipment. There is, therefore, a need in the industry for an improved method of plasma spraying mullite coatings onto silicon based ceramics and composites which does not require heating in a furnace.

Another problem with the approach taken by Lee et al. is that it involves depositing an amorphous aluminosilicate material onto the substrate and then recrystallizing this material in-situ within the furnace during spraying. This can result in volume shrinkage and associated stress in the coating, which can limit the coating life.

SUMMARY OF THE INVENTION

The present invention contemplates and demonstrates an improved method for plasma spraying a mullite coating onto the surface of a silicon based ceramic or composite which does not require preheating above the crystallization temperature of mullite. The invention also contemplates and demonstrates a method for plasma spraying a coating which comprises at least about 85% by volume of crystalline mullite and about 0.5% to about 15% by volume amorphous material.

The method of the invention is carried out by plasma spraying mullite powder(s) onto the surface of the substrate to be coated using a commercially available thermal spray plasma torch. During the plasma spraying operation, the nozzle outlet of the spray gun is maintained at a predetermined distance from the surface of the substrate and the substrate and nozzle outlet are moved relative to one another. The distance at which the nozzle outlet is spaced from the substrate, or the so called "stand-off" distance, is chosen to minimize the time the mullite powder(s) are subjected to the plasma flame. The speed at which the substrate and nozzle outlet move relative to one another is preferably selected to limit the residence time of the flame against the substrate surface and also to control the deposition rate. The feed rate of the powder(s) passing through the spray gun is also closely controlled in order to restrict the amount of plasma energy absorbed by the powder(s).

The powders used in the method of the invention are free-flowing, non-agglomerated, fused and crushed mullite powders of relatively large or coarse size, having an average particle size of about 62 microns, and a range of about 16 to 176 microns. It is believed that the coarse powders remain relatively solid when exposed to the plasma flame except for the outer surface portions of the powders which dissociate and/or soften.

It is possible according to the invention to plasma spray a mullite coating onto the surface of a silicon based ceramic or composite wherein the coating, as applied and without heating to the crystallization point of mullite, is at least 85% crystalline mullite and about 0.5% to 15% by volume total of amorphous material and dissociated phases of mullite. This is accomplished by closely controlling the spray parameters which affect the absorption of the plasma energy by the mullite powder, including the type of feedstock and its particle size, stand-off distance, powder feed rate, and the plasma parameters such as gas composition and power.

The coating of the invention as applied comprises particles of crystalline mullite in a matrix composed of amorphous material and dissociated phases of mullite. The crystalline mullite particles constitute at least about 85% by volume of the coating while the matrix constitutes about 0.5% to about 15% by volume of the coating.

BRIEF DESCRIPTION OF THE DRAWINGS

The invention will now be described in greater detail with particular reference to the accompanying drawings wherein.

BEST MODE FOR CARRYING OUT THE INVENTION

Figure 1:
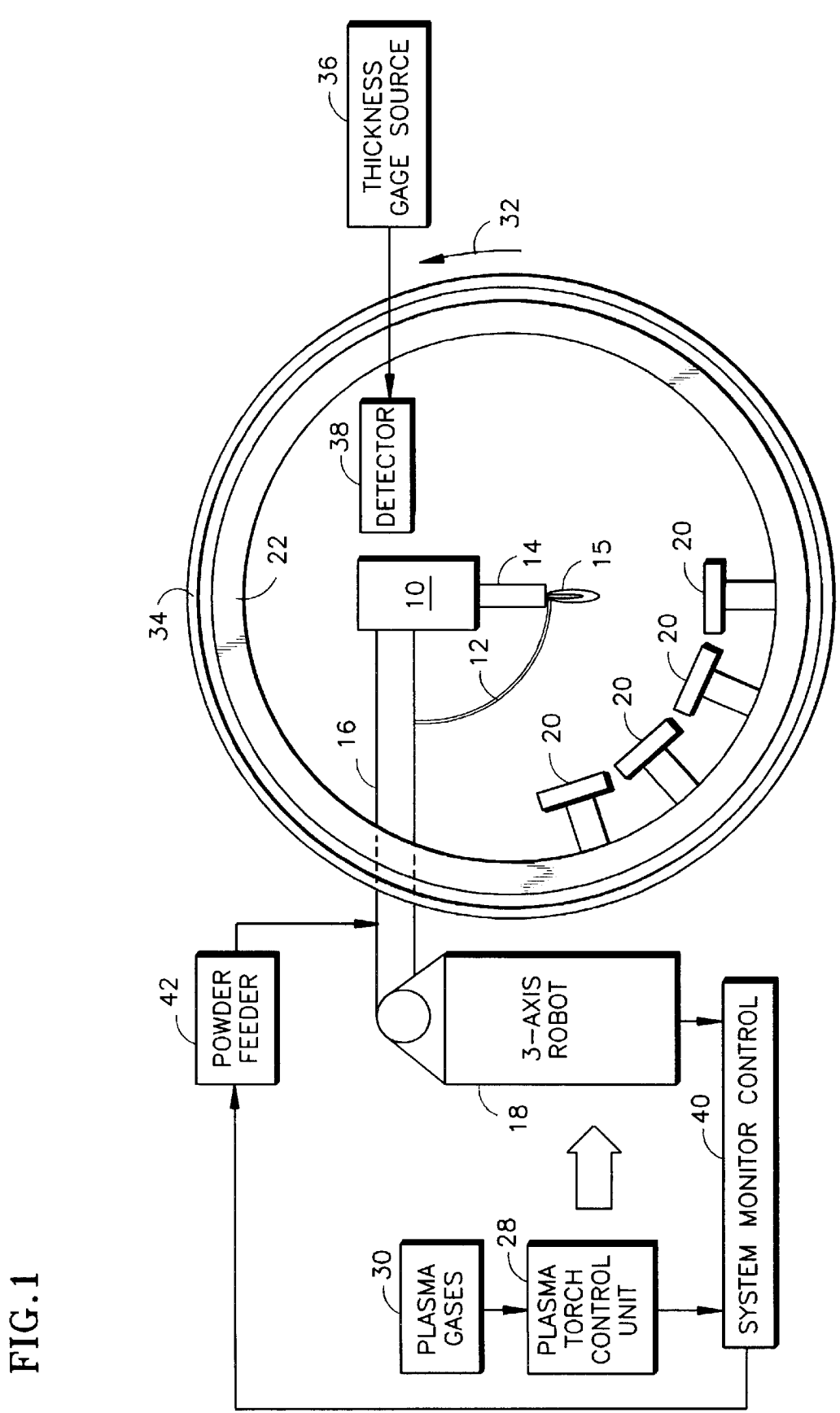
FIG. 1 is a front view of a plasma spraying apparatus useful for preparing mullite coatings according to the invention.
Figure 2:
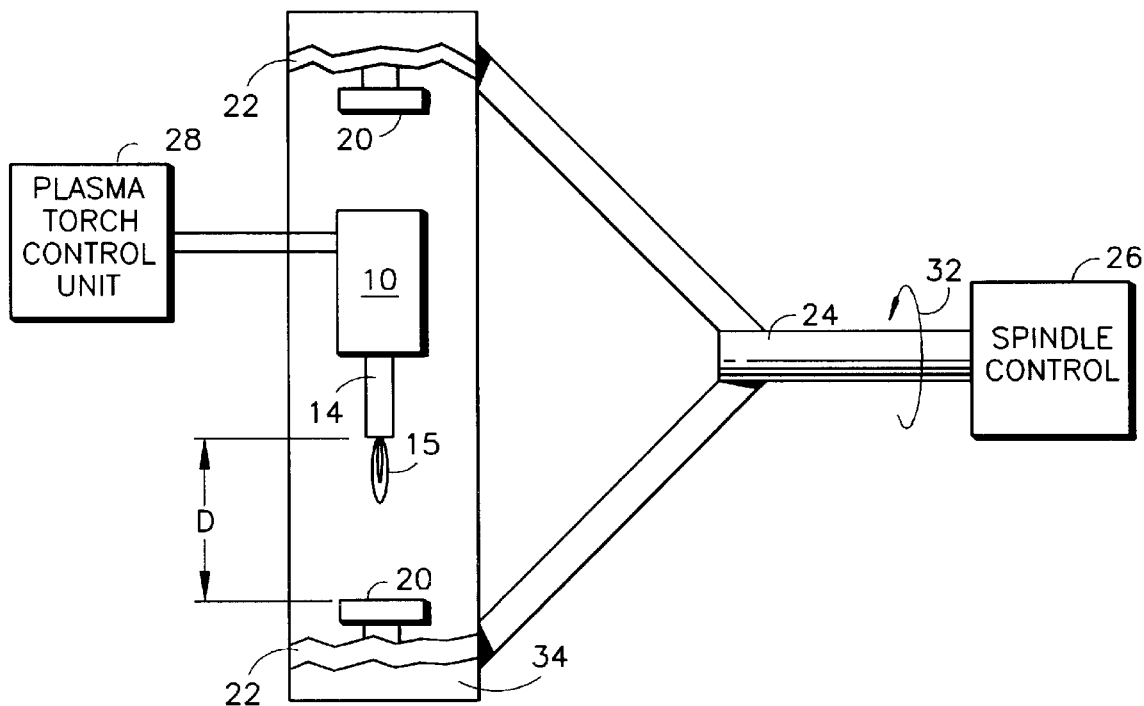
FIG. 2 is a side elevational view of the plasma spraying apparatus shown in FIG. 1.

Referring now to the drawings and particularly to FIGS. 1 and 2 thereof, there is shown an apparatus for preparing mullite coatings according to the invention. As shown, the apparatus includes a plasma spray torch 10 having a powder injector 12 and a nozzle outlet 14 from which issues a flame 15. The torch 10 is attached to the outer end of a shaft 16 which is operatively connected to a three-axis robot 18. The robot 18 controls the position of the torch 10 relative to a plurality of specimens 20 to be coated which are attached to a rotating, circular spray fixture 22. The spray fixture 22 is mounted to the outer end of a rotating spindle 24 (see FIG. 2) which is operatively connected to a rotational control unit 26.

A plasma torch control unit 28 is provided for controlling the plasma spray torch 10. This unit 28 controls both the flow of plasma gases from a plasma gas supply 30, and the power of the plasma spray torch 10.

The ceramic specimens 20 to be coated are mounted around the inner periphery of the rotating spray fixture 22. The coatings are applied by the plasma spray torch 10 to each specimen as it rotates past the nozzle outlet 14. In the plasma spray apparatus illustrated, rotation of the spray fixture 22 is in the counterclockwise direction as shown by the arrow 32.

The nozzle outlet 14 is maintained a predetermined distance or stand-off "D" from the surface of each specimen 20 as best illustrated in FIG. 2. As shall be more fully described hereinafter, this "stand-off" distance may be between about 1 inch (2.54 centimeters (cm)) and 10 inches (25.4 cm). Preferably, the "stand-off" distance is less than about 4 inches and most preferably between about 2.5 inches (6.35 cm) and about 3 inches (7.6 cm) from the surface of the substrate to be coated.

The ceramic specimens 20 are heated by a natural gas torch ring 34 located on the back side of the fixture 22. The natural gas torch ring 34 is circumferentially oriented to surround the rotating spray fixture 22.

A thickness gage 36 and detector 38 are also provided at the outer periphery of the spray fixture 22. The detector 38 senses each specimen 20 on the rotating fixture 22 as it passes by the thickness gage 36. The thickness gage 36 measures the thickness of the coating applied to each specimen 20 by the torch 10 during rotation of the spray fixture 22.

Operation of the plasma spray apparatus is controlled by a computerized system monitor 40. The monitor 40 regulates the rotational speed of the spindle 24 and consequently that of the spray fixture 22 via the control unit 26. The monitor 40 further regulates heating of the specimens 20 by the natural gas torch 34, as well as the flow of plasma gas and the feed rate of the mullite powders from the powder supply 42.

It has been discovered in accordance with the present invention that adherent, substantially crack-free mullite coatings can be successfully applied to silicon based ceramics and ceramic composites without heating the substrate to above the crystallization temperature of mullite by closely controlling the plasma spray parameters, namely, the type of feed stock and its particle size, the nozzle stand-off distance, powder feed rate and the plasma parameters, such as gas composition and power. Close control of these parameters within certain limits is essential in order to attain satisfactory coatings according to the invention.

The type of mullite feedstock used in the present method and its particle size are essential in the practices of the invention. These two parameters contribute toward the amount of plasma energy that is absorbed by the powders prior to deposition. Basically, two types of powders were evaluated during experimentation leading to the invention. These were (1) spray dried powders and (2) fused and crushed powders. Spray dried powders are spherical agglomerates of very small particles. Spray drying these very small particles into larger spherical agglomerates allows for the powder to flow more freely during the spraying operation. Fused and crushed powders are large solid particles of roughly the same diameter as spray dried agglomerated powders and also flow freely.

Spray dried powders of mullite, when plasma sprayed onto silicon based ceramics and composites, were found to produce unsatisfactory coatings. While these powders adhered well to the substrates after immediately plasma spraying, the coatings eventually spalled and cracked upon further heat treatment. X-ray diffraction studies of these coatings showed that they contain greater than 15% by volume of amorphous material and mullite dissociation products. Subsequent heat treatment of these coatings to temperatures greater than 1800° F. (about 980° C.), the crystallization temperature of mullite, caused crystallization, which is accompanied by an overall volume contraction in the coating. This change in volume causes the coating to shrink and pull away from the substrate, causing the coating to spall, crack and/or debond.

It has been found, however, that fused and crushed powders of mullite produce acceptable coatings when used in the plasma spray method according to the invention. The particle size of the fused and crushed mullite powders is critical and should be maintained within the range of from about 10 microns to about 250 microns. The preferred particle size range is from about 16 microns to about 176 microns with the average of about 62 microns. Coatings prepared from fused and crushed mullite powders in accordance with the invention adhere very well to the ceramic substrates and are essentially crack free after thermal exposure to temperatures above 2200° F. (about 1200° C.)

With this feed stock powder and under the parameters considered in this invention, the as sprayed coatings contain less than 15% by volume of amorphous material and mullite dissociation products. On cooling after spraying, this amorphous material remains amorphous since spraying is carried out below the crystallization point of mullite. On heating to temperatures above 1800° F. (about 980° C.), there is only a small amount of conversion to crystalline mullite during thermal exposure and, therefore, very little stress generated. Further, the amorphous material is believed to act as a binder to adhere the coarse mullite to the substrate and to itself. Consequently, the as sprayed coating preferably has at least 0.5% by volume amorphous material and mullite dissociation products.

The nozzle stand-off distance is also critical in the practice of the invention. Generally speaking, as the stand-off distance increases, more plasma heat can be absorbed by the mullite powders, which can lead to dissociation, resulting in a large percentage of amorphous material and dissociation products being deposited in the coating. It has been determined that, depending on other plasma spray parameters chosen, the nozzle outlet should be maintained at a stand-off distance of between about 1 inch (2.54 cm) and 10 inches (25.4 cm) from the surface of the substrate being coated. Preferably, the stand-off distance is kept below about 4 inches (10.16 cm) with the most preferred range being about 2.5 inches (6.35 cm) to about 3 inches (7.6 cm).

The rate at which the mullite powders are fed through the plasma torch is also important. As the feed rate increases, more and more powder passes through the plasma flame per unit of time. Consequently, the amount of plasma energy that is absorbed by the powders in a given amount of time is decreased since there is a greater concentration of particles exposed to the flame. This limits the amount of dissociation that can occur and reduces the amount of amorphous material that is deposited. Depending on the other plasma spray parameters used, powder feed rates of from about one gram per minute up to several hundred grams per minute may be employed. Powder feed rates of about 20 to about 100 grams per minute are preferred and have been used successfully with fused and crushed mullite powders at a stand-off distance of about 3 inches (7.6 cm).

Plasma torch parameters, such as gas composition and power, also contribute to the amount of plasma energy that can be absorbed by the mullite powder. As the flame temperature increases, the amount of energy that can be absorbed by the mullite powder increases. Likewise, as the flame temperature decreases, the amount of energy that can be absorbed by the mullite powder decreases. The plasma torch parameters are interrelated with feedstock, particle stand-off distance, and powder feed rate, for example, such that at higher flame temperatures (greater energy content, e.g., greater than 45 KW power) larger particle sizes up to about 250 microns may be utilized, stand-off distances may be decreased to about 1 inch (2.54 cm) and powder feed rates of up to several hundred grams per minute may be employed. Conversely, at lower flame temperatures (low energy content, e.g., less than 25 KW power) smaller particle sizes down to less than 10 microns may be used, stand-off distances may be increased to 10 inches (25.4 cm), and feed rates down to 1 gram per minute may be employed. Preferably the flame temperature, as described herein, is maintained at about 25 to 45 KW. Within that range the specific parameters previously mentioned, i.e., stand-off distance of less than 4 inches (10.16 cm), powder feed rates of about 20 to 100 grams per minute, and particle size range of about 16 to 176 microns apply.

The back side heating of the ceramic substrates by the heating torch may also be important in carrying out the method of the invention. Back side heating is commonly employed in order to minimize interfacial stresses which occur during cooling due to dimensional changes associated with the coefficient of thermal expansion (CTE) and temperature change ($\Delta T$) of the coating and substrate as a result of the plasma spray process. A back side heating temperature of between about 1550° F. (about 845° C.) and 1720° F. (about 935° C.) has been found suitable.

The spindle speed or rate at which the spray fixture 22 rotates may also be important in the practice of the invention. This parameter, expressed in rotations per minute (rpm) which is fixture dependent, determines how many times per minute a particular substrate passes through the plasma flame. Thus, the spindle speed is a factor which also helps to control the amount of heat energy that is transferred to the substrate. Further, the spindle controls in part the thickness of the coating deposition process per rotation. In all the experimental work so far conducted, the spindle speed has been successfully varied from about 20 to about 100 rpm without any significant change in the coating.

In order to demonstrate the effectiveness of the invention, a series of experiments were conducted using both spray dried powders and fused and crushed powders of mullite of different particles sizes to plasma spray coatings onto silicon based ceramic composites. The composites were composed of silicon carbide fibers in a matrix of silicon carbide (SiC/SiC) formed by chemical vapor infiltration, CVI. The plasma torch used in the experiments was a Metco 3MB torch. The power level was between 25 and 45 KW. The spray fixture was nominally 31 inches (78.7 cm). During the experiments, the stand-off distance of the nozzle outlet was varied between about 3 inches (7.6 cm) and 4 inches (10.16 cm) and both the backside heating temperature and spindle speed were also varied. The plasma arc gases were $N_2/H_2$ and the powder flow rate was between 20 and 35 grams per minute. The substrates were mounted to the rotating fixture which was rotated at a spindle speed of from about 30 to about 100 rpm, and the nozzle was moved relative to the substrate enable the surface to be coated. The substrates were subjected to backside heating to temperatures of from about 630° F. (about 330° C.) to about 1720° F. (about 935° C.) The results of the experiments are illustrated in Table I below:

TABLE I

MULLITE COATING OF SiC/SiC COMPONENTS

| Run No. | Mullite Feed Stock Type | Powder Size (microns) | Back-Side Heating Temp (°F.) | Stand-Off (inches) | Feed Rate (g/min) | Spindle Speed (rpm) | As Sprayed Condition | Condition After Heating at Above 2200° F. for 3 Hrs |
|---|---|---|---|---|---|---|---|---|
| 1 | Spray Dried* | 44 avg. | 630 | 3.0 | 35 | 60 | Coating Lifted at Corners | N/A |
| 2 | Spray Dried* | 44 avg. | 1520 | 3.0 | 35 | 60 | Coating Spalled | N/A |
| 3 | Spray Dried* | 44 avg. | 1600 | 3.0 | 20 | 60 | Coating Intact | Cracks/Debonded |
| 4 | Spray Dried* | 44 avg. | 1720 | 4.0 | 20 | 75 | Coating Intact | Coating Spalled |
| 5 | Fused & Crushed | 28 avg. <7.8–88 | 1550 | 4.0 | 20 | 30 | Coating Intact | Coating Spalled |
| 6 | Fused & Crushed | 44 avg. 7.8–125 | 1550 | 3.0 | 20 | 30 | Coating Intact | Cracks/Debonded |
| 7 | Fused & Crushed | 62 avg. 16–176 | 1550 | 3.0 | 20 | 30 | Coating Intact | Coating Intact |

TABLE I-continued

MULLITE COATING OF SiC/SiC COMPONENTS

| Run No. | Mullite Feed Stock Type | Powder Size (microns) | Back-Side Heating Temp (°F.) | Stand-Off (inches) | Feed Rate (g/min) | Spindle Speed (rpm) | As Sprayed Condition | Condition After Heating at Above 2200° F. for 3 Hrs |
|---|---|---|---|---|---|---|---|---|
| 8 | Fused & Crushed | 62 avg. 16–176 | 1550 | 3.0 | 35 | 100 | Coating Intact | Coating Intact |
| 9 | Fused & Crushed | 62 avg. 16–176 | 1550 | 3.0 | 20 | 60 | Coating Intact | Coating Intact |

\* - agglomerate size stated - Actual particles making up agglomerates are about 5 microns or smaller.

It will be seen from Table I that the coatings prepared from spray dried powders at lower temperatures, i.e., 630° F. (about 330° C.) to 1520° F. (about 827° C.), were unsatisfactory in that the coatings pulled away from the substrates or spalled shortly after being applied. Coatings prepared from spray dried powders at higher temperatures, i.e., 1600° F. (about 870° C.) to 1720° F. (about 935° C.) remained intact after being applied but cracked and spalled when later heated to temperatures above 2200° F. (about 1200° C.).

Fused and crushed powders of mullite, on the other hand, produced coatings which were satisfactory in the as-sprayed condition. All of the fused and crushed powders had average particle sizes of 28 microns or greater. However, after exposure to temperatures above 1800° F. (about 980° C.), some of the coatings spalled and/or cracked and de-bonded. Only the coarse fused and crushed powders, having an average particle size of 62 microns, survived the elevated temperature exposures. Using this coarse powder, feed rates of 20 to 35 grams/min and spindle speeds of 30–100 rpm were found to be acceptable for producing good adherent coatings.

Figure 3:
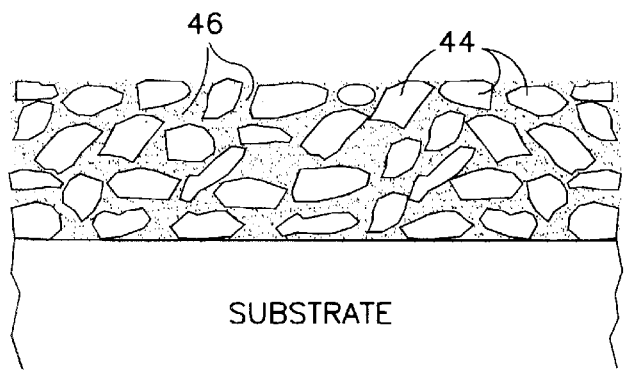
FIG. 3 is a schematic, cross sectional view of a mullite coating prepared according to the present invention.

Plasma sprayed mullite coatings prepared during the above described tests were also subjected to microscopic examination. A schematic cross sectional representation of a typical mullite coating according to the invention is shown in FIG. 3. As shown, the coating, as applied and without further heating, comprises particles of crystalline mullite shown at 44, in a matrix, shown at 46, composed essentially of amorphous material (predominantly aluminosilicate) and dissociated phases of mullite. Upon subsequently heating the coatings to above about 2200° F. (about 1200° C.), the amorphous material (predominantly aluminosilicates) and dissociated phases of mullite were converted to the crystalline phase. However, in this instance, the crystallization of the amorphous material does not result in substantial cracking or spalling of the coating probably due to the overall small amount of stress associated with the small quantity of amorphous material. Eventually this stress may relax out of the structure due to diffusion of the atoms in a process analogous to the process allowing crystallization. The presence of limited amounts of amorphous material and dissociated phases in the coating is not detrimental, and in fact, is believed to be preferable.

The compositions of the coatings as applied in the above described experiments were determined by x-ray diffraction analysis. The results of these studies are shown Table II below:

TABLE II

MULLITE COATING COMPOSITION VIA X-RAY DIFFRACTION

| Run No. | Mullite Feed Stock Type | Particle Size (microns) | As Received Powder (vol %) | | | |
|---|---|---|---|---|---|---|
| | | | Crystalline | $Al_2O_3$ | $SiO_2$ | Other |
| 3 | Spray Dried | 44 avg. | 95 | 4 | 1 | |
| 5 | Fused & Crushed | 28 avg. <7.8–88 | 93 | 5 | | 2 |
| 6 | Fused & Crushed | 44 avg. 7.8–125 | 95 | 2 | | 3 |
| 9 | Fused & Crushed | 62 avg. 16–176 | 98 | 1 | | 1 |
| 8 | Fused & Crushed | 62 avg. 16–176 | 95 | 2 | | 3 |
| 7 | Fused & Crushed | 62 avg. 16–176 | 98 | 1 | | 1 |

| Run No. | As Sprayed Coating (vol %) | | | | Aged Coating (2200° F./3 hrs/Air) (vol. %) | | | |
|---|---|---|---|---|---|---|---|---|
| | Crystalline | $Al_2O_3$ | $SiO_2$ | Amorphous | Crystalline | $Al_2O_3$ | $SiO_2$ | Amorphous |
| 3 | 80 | 10 | | 10 | 84 | 2 | 3 | 11 |
| 5 | 10 | 40 | | 50 | N/A | N/A | N/A | N/A |
| 6 | 72 | 9 | | 19 | 83 | 8 | 4 | 5 |

TABLE II-continued

MULLITE COATING COMPOSITION VIA X-RAY DIFFRACTION

| 9 | 93 | 6 |   | <1 | 93 | 3 | 4 | 0 |
| 8 | 90 | 2 | 2 | 6  | 92 |   |   | 8 |
| 7 | 86 | 6 |   | 8  | 90 | 3 |   | 7 |

It will be seen from Table II that coatings prepared using spray dried powders had a composition of about 80% crystalline and about 20% amorphous material and mullite dissociation products in the as fabricated condition. These compositions are for coatings reported as Runs 1 to 4 in Table 1 which were unacceptable. Coatings prepared using fused and crushed powders of a fine particle size, i.e. about 28 microns, were composed of only about 10% crystalline mullite with as much as 50% amorphous material. These coatings were not evaluated after high temperature exposure because they spalled. Coatings prepared using fused and crushed powders of a larger particle size, i.e., about 44 microns, (Run 6 in Table I) showed better results containing 72% crystalline mullite as sprayed but the percentage of amorphous material (about 19%) was too high. The aged coating in fact contained about 5% amorphous material, resulting in cracking and spalling. Finally, coatings prepared using the larger size coarse powders of mullite, i.e., about 62 microns, had a composition containing only 8% amorphous material in one sample coating, 6% in a second sample, and less than 1% amorphous materials in a third sample coating as sprayed. When heated to above 2200° F. (about 1200° C.) for 3 hours, these sample coatings contained only 7, 8 and zero percent amorphous material. These latter coatings are the same coatings reported as Runs 7, 8, and 9 in Table I, and remained intact after thermal exposure.

What is claimed is:

1. A method for plasma spraying a mullite coating onto a surface of a silicon based ceramic substrate, comprising the steps of:

maintaining a plasma spray gun nozzle outlet within a predetermined distance from the surface to be sprayed, wherein a flame exits from said outlet and at least temporarily resides against the surface to be sprayed;

moving said surface to be sprayed and said outlet relative to one another to limit the residence time of the flame against said surface;

introducing a fused and crushed mullite powder of a predetermined particle size into the flame at a predetermined powder feed rate wherein said mullite powder has a crystallization temperature;

maintaining the substrate at a temperature below the mullite powder crystallization temperature;

selecting said particle size, said powder feed rate, said predetermined nozzle outlet distance and the speed at which said nozzle outlet and said surface move relative to one another, such that the mullite powder particles are not heated to such a high temperature as to cause excessive dissociation of the mullite within the flame but sufficiently high to melt said surfaces of said particles; and whereby the applied coating is at least 85% by volume crystalline mullite and about 0.5% to about 15% by volume amorphous material and dissociated phases of mullite.

2. The method according to claim 1, wherein said surface to be sprayed is heated to a temperature sufficient to minimize stresses due to coefficient of thermal expansion and temperature changes of the coating and substrate during deposition.

3. The method according to claim 2, wherein said surface to be sprayed is heated to a temperature between about 845° C. and about 935° C.

4. The method according to claim 1, wherein said nozzle outlet is maintained at a distance of between about 1 and 10 inches from said surface to be coated.

5. The method according to claim 4, wherein said nozzle outlet is maintained at a distance of less than about 4 inches from said surface to be coated.

6. The method according to claim 5, wherein said nozzle outlet is maintained at a distance of between about 2.5 and 3 inches from said surface to be coated.

7. The method according to claim 1, wherein said substrate is mounted on a rotating fixture and wherein said surface to be coated is moved along a circular path relative to said flame at a speed of from about 20 to 100 revolutions per minute.

8. The method according to claim 1, wherein the fused and crushed mullite powders have a particle size within the range of from about 10 microns to about 250 microns.

9. The method according to claim 8 wherein the fused and crushed mullite powders have a particle size within the range of from about 16 microns to about 176 microns with an average particle size of about 62 microns.

10. The method according to claim 1 wherein said mullite powders are fed through said nozzle outlet at a rate of from about one gram per minute to about several hundred grams per minute.

11. The method according to claim 10 wherein said mullite powders are fed through said nozzle outlet at a rate of from about 20 grams per minute to about 100 grams per minute.

12. A method for plasma spraying a mullite coating onto a surface of a silicon based ceramic substrate, comprising the steps of:

maintaining a plasma spray gun nozzle outlet within a distance of from about 1 to 10 inches from the surface to be sprayed, wherein a flame exits from said outlet and at least temporarily resides against the surface to be sprayed;

maintaining the thermal energy of the plasma flame in a range from about 25 to 45 kW power;

moving said surface to be sprayed and said outlet relative to one another to limit the residence time of the flame against said surface;

heating said surface to be sprayed to a temperature sufficient to minimize stresses due to coefficient of thermal expansion and temperature changes of the coating and substrate during deposition wherein said temperature is below the crystallization temperature of mullite;

introducing a fused and crushed mullite powder of a particle size between about 10 and 250 microns into the flame at a powder feed rate of between about one and several hundred grams per minute; whereby the mullite powder particles are not heated to such a high temperature as to cause excessive dissociation of the mullite within the flame but sufficiently high to melt said surfaces of said particles; and whereby the applied coating is at least 85% by volume crystalline mullite and about 0.5% to about 15% by volume amorphous material and dissociated phases of mullite.

13. The method according to claim 12, wherein said surface to be sprayed is heated to a temperature between about 845° C. and about 935° C.

14. The method according to claim 12, wherein said nozzle outlet is maintained at a distance of less than about 4 inches from said surface to be coated.

15. The method according to claim 14, wherein said nozzle outlet is maintained at a distance of between about 2.5 and 3 inches from said surface to be coated.

16. The method according to claim 12, wherein said substrate is mounted on a rotating fixture and wherein said surface to be coated is moved along a circular path relative to said flame at a speed of from about 20 to 100 revolutions per minute.

17. The method according to claim 12, wherein the fused and crushed mullite powders have a particle size within the range of from about 16 microns to about 176 microns with an average particle size particle size of about 62 microns.

18. The method according to claim 12, wherein said mullite powders are fed through said nozzle outlet at a rate of from about 20 grams per minute to about 100 grams per minute.

19. A method for plasma spraying a mullite coating onto a surface of a silicon based ceramic substrate, comprising the steps of:

maintaining a plasma spray gun nozzle outlet within a distance of less than 4 inches from the surface to be sprayed, wherein a flame exits from said outlet;

mounting said substrate onto a rotating fixture and moving said surface to be sprayed in a circular path relative to said nozzle outlet at a speed of from about 20 to 100 revolutions per minute;

heating said surface to be sprayed to a temperature of between about 1550° F. and 1720° F.;

introducing a fused and crushed mullite powder of a particle size within the range of from about 16 microns to about 176 microns with an average of about 62 microns into the flame at a powder feed rate of from about 20 grams per minute to about 100 grams per minute; whereby the mullite powder particles are not heated to such a high temperature as to cause excessive dissociation of the mullite within the flame but sufficiently high to melt said surfaces of said particles; and the applied coating is at least 85% crystalline mullite and about 0.5% to about 15% by volume amorphous material and dissociated phases of mullite.

* * * * *